(12) United States Patent
Haag et al.

(10) Patent No.: US 10,109,823 B2
(45) Date of Patent: Oct. 23, 2018

(54) BATTERY PACK COVER SYSTEM

(71) Applicant: FORD GLOBAL TECHNOLOGIES, LLC, Dearborn, MI (US)

(72) Inventors: Jeffrey Matthew Haag, Detroit, MI (US); Brock Dunlap, Dearborn, MI (US); Joseph Todd White, Woodhaven, MI (US); Scott Benedict, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 100 days.

(21) Appl. No.: 15/268,852

(22) Filed: Sep. 19, 2016

(65) Prior Publication Data

US 2018/0083231 A1    Mar. 22, 2018

(51) Int. Cl.
| | |
|---|---|
| H01M 2/08 | (2006.01) |
| H01M 2/02 | (2006.01) |
| H01M 2/04 | (2006.01) |
| H01M 2/10 | (2006.01) |
| H01M 10/42 | (2006.01) |

(52) U.S. Cl.
CPC .......... *H01M 2/024* (2013.01); *H01M 2/043* (2013.01); *H01M 2/1077* (2013.01); *H01M 2010/4271* (2013.01); *H01M 2220/20* (2013.01)

(58) Field of Classification Search
CPC .... H01M 2/024; H01M 2/1077; H01M 2/043; H01M 2010/4271; H01M 2220/20
See application file for complete search history.

(56) References Cited

U.S. PATENT DOCUMENTS

| | | | |
|---|---|---|---|
| 2,633,237 | A | 3/1953 | Heyer |
| 4,562,126 | A | 12/1985 | Chartrain et al. |
| 8,872,474 | B2 | 10/2014 | Scheucher |
| 9,321,340 | B2 | 4/2016 | Maskew et al. |
| 2014/0255757 | A1 | 9/2014 | Kang et al. |
| 2015/0079454 | A1 | 3/2015 | Maguire et al. |
| 2015/0311480 | A1 | 10/2015 | Wartenberg |
| 2015/0349306 | A1* | 12/2015 | Watanabe ............... H01M 2/04 429/56 |
| 2016/0049696 | A1 | 2/2016 | Choi |

FOREIGN PATENT DOCUMENTS

| | | | |
|---|---|---|---|
| JP | 2014022154 A | 2/2014 | |
| WO | WO 2014/119722 | * 8/2014 | ............. H01M 2/12 |

* cited by examiner

*Primary Examiner* — Cynthia K Walls
(74) *Attorney, Agent, or Firm* — Carlson, Gaskey & Olds

(57) ABSTRACT

A battery pack includes an enclosure assembly including a tray and a cover system secured relative to the tray. The cover system includes a first cover and a second cover that overlap one another. At least one of the first cover and the second cover includes a stepped design. Another battery pack includes an insert received within a tray and adapted to establish a first compartment and a second compartment within the tray. A first cover is positioned to cover the first compartment and a second cover is positioned to cover the second compartment.

12 Claims, 5 Drawing Sheets

BATTERY PACK COVER SYSTEM

TECHNICAL FIELD

This disclosure relates to battery packs for electrified vehicles. An exemplary battery pack includes an enclosure assembly having a cover system adapted for accessing portions of the battery pack while limiting access to other portions of the battery pack.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to power and propel the vehicle.

A high voltage battery pack powers the electric machines and other electrical loads of the electrified vehicle. The battery pack includes a plurality of interconnected battery cells that store energy for powering these electrical loads. An enclosure assembly houses the battery cells and seals the pack from moisture ingress. It may become necessary to service the battery pack during its service life. Servicing the battery pack often requires removing an entire cover of the enclosure assembly to gain access to the serviceable components.

SUMMARY

A battery pack according to an exemplary aspect of the present disclosure includes, among other things, an enclosure assembly including a tray and a cover system secured relative to the tray. The cover system includes a first cover and a second cover that overlap one another. At least one of the first cover and the second cover includes a stepped design.

In a further non-limiting embodiment of the foregoing battery pack, both of the first cover and the second cover includes stepped designs.

In a further non-limiting embodiment of either of the foregoing battery packs, at least one of the first cover and the second cover includes a main body and a leg that extends from the main body.

In a further non-limiting embodiment of any of the foregoing battery packs, the leg extends in a first plane and the main body extends in a second plane that is vertically displaced from the first plane.

In a further non-limiting embodiment of any of the foregoing battery packs, the first cover includes a first leg that overlaps a second leg of the second cover.

In a further non-limiting embodiment of any of the foregoing battery packs, a first seal is disposed between the first cover and a mating surface.

In a further non-limiting embodiment of any of the foregoing battery packs, the mating surface is part of the tray.

In a further non-limiting embodiment of any of the foregoing battery packs, a second seal is disposed between the first cover and the second cover.

In a further non-limiting embodiment of any of the foregoing battery packs, a fastener extends through the second cover, the second seal, the first cover, and then through the first seal.

In a further non-limiting embodiment of any of the foregoing battery packs, each of the first cover and the second cover includes a plurality of weight reducing openings.

In a further non-limiting embodiment of any of the foregoing battery packs, the first cover includes a leg that extends underneath the second cover.

In a further non-limiting embodiment of any of the foregoing battery packs, a first seal is positioned between the leg and a mating surface of the tray.

In a further non-limiting embodiment of any of the foregoing battery packs, a second seal is positioned between the leg and the second cover.

A battery pack according to another exemplary aspect of the present disclosure includes, among other things, a tray, an insert received within the tray and adapted to establish a first compartment and a second compartment within the tray. A first cover is positioned to cover the first compartment and a second cover is positioned to cover the second compartment.

In a further non-limiting embodiment of the foregoing battery pack, the insert includes a plurality of sidewalls and a bracket that extends between at least two opposing sidewalls of the plurality of sidewalls.

In a further non-limiting embodiment of either of the foregoing battery packs, the bracket separates the first compartment from the second compartment.

In a further non-limiting embodiment of any of the foregoing battery packs, a first seal is disposed between the insert and a mating surface of the tray.

In a further non-limiting embodiment of any of the foregoing battery packs, the mating surface is a flange of a sidewall of the tray.

In a further non-limiting embodiment of any of the foregoing battery packs, a second seal is disposed between the first cover and the insert.

In a further non-limiting embodiment of any of the foregoing battery packs, a third seal is disposed between the second cover and the insert.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes a cover system designed to provide access to serviceable components of the battery pack while limiting access to components that do not require servicing. The cover system may include a first cover configured to cover a first compartment of the battery pack, a second cover configured to cover a second compartment of the battery pack, and multiple seals. In some embodiments, the first and second covers overlap one another. In other embodiments, the cover system includes an insert that extends between the first cover and the second cover. These and other features are discussed in greater detail in the following paragraphs of this detailed description.

Figure 1:
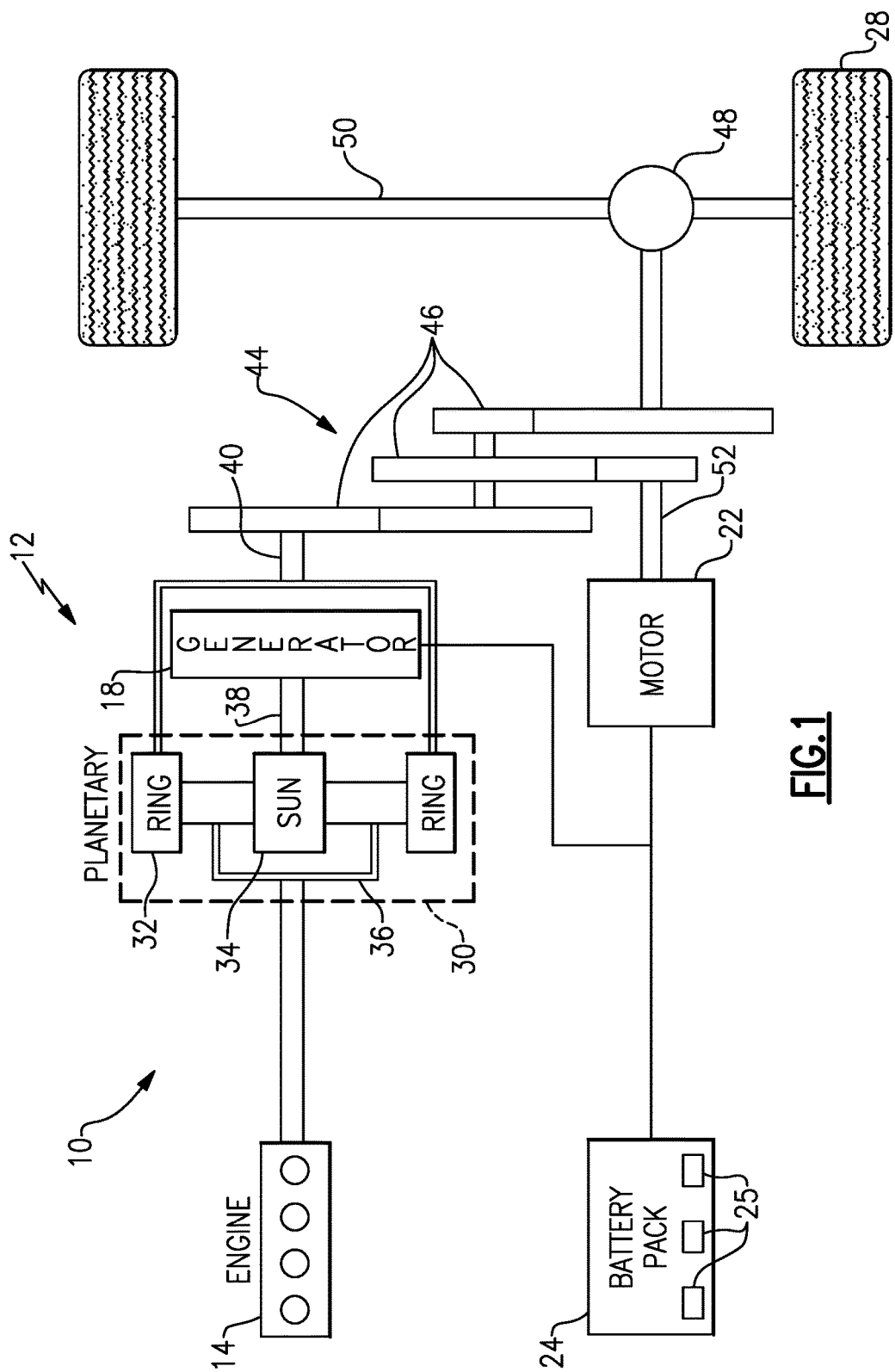
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and fuel cell vehicles.

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems generate torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22 and/or other electrical loads of the electrified vehicle 12. Other types of energy storage devices and/or output devices could also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
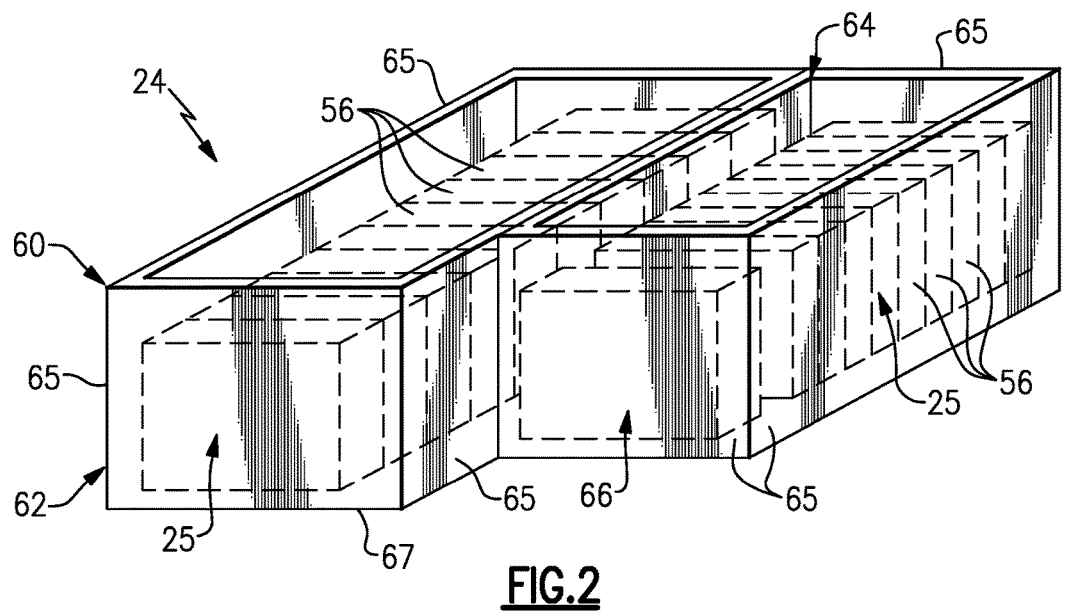
FIG. 2 illustrates a battery pack according to a first embodiment of this disclosure.

FIG. 2 illustrates a battery pack 24 that can be employed within an electrified vehicle. For example, the battery pack 24 could be part of the electrified vehicle 12 of FIG. 1. FIG. 2 is a perspective view of the battery pack 24, and its internal components (e.g., features 25 and 66) are shown in phantom.

The battery pack 24 includes a plurality of battery cells 56 that store electrical power for powering various electrical loads of the electrified vehicle 12. Although a specific number of battery cells 56 are depicted in FIG. 2, the battery pack 24 could employ a greater or fewer number of battery cells within the scope of this disclosure. In other words, this disclosure is not limited to the specific configuration shown in FIG. 2.

The battery cells 56 may be stacked side-by-side to construct a grouping of battery cells 56, sometimes referred to as a "cell stack." The battery pack 24 can include one or more separate groupings of battery cells 56.

In a non-limiting embodiment, the battery cells 56 are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery cells 56, along with any other support structures (e.g., spacers, rails, walls, plates, bindings, etc.), may collectively be referred to as a battery assembly 25. Although the battery pack 24 of FIG. 2 is depicted as having two battery assemblies 25, the battery pack 24 could include a greater or fewer number of battery assemblies within the scope of this disclosure. In addition, although depicted as extending longitudinally inside the battery pack 24, the battery assemblies 25 could alternatively be arranged to extend horizontally inside the battery pack 24.

An enclosure assembly 60 houses each battery assembly 25 of the battery pack 24. The enclosure assembly 60 also houses one or more electronic modules 66. The electronic modules 66 could include a battery electronic controller (BEC), a battery energy control module (BECM), or both. Various other electronics, including but not limited to a battery pack sensing module (BPSM), may additionally be housed within the enclosure assembly 60.

In a non-limiting embodiment, the enclosure assembly 60 is a sealed enclosure that includes a tray 62 and a cover system 64. The tray 62 includes sidewalls 65 that extend upwardly from a base 67 to establish one or more compartments for housing the battery assemblies 25 and the electronic modules 66. The cover system 64 is secured to the tray 62 to enclose and seal the battery assemblies 25 and the electronic modules 66 of the battery pack 24.

Figure 3:
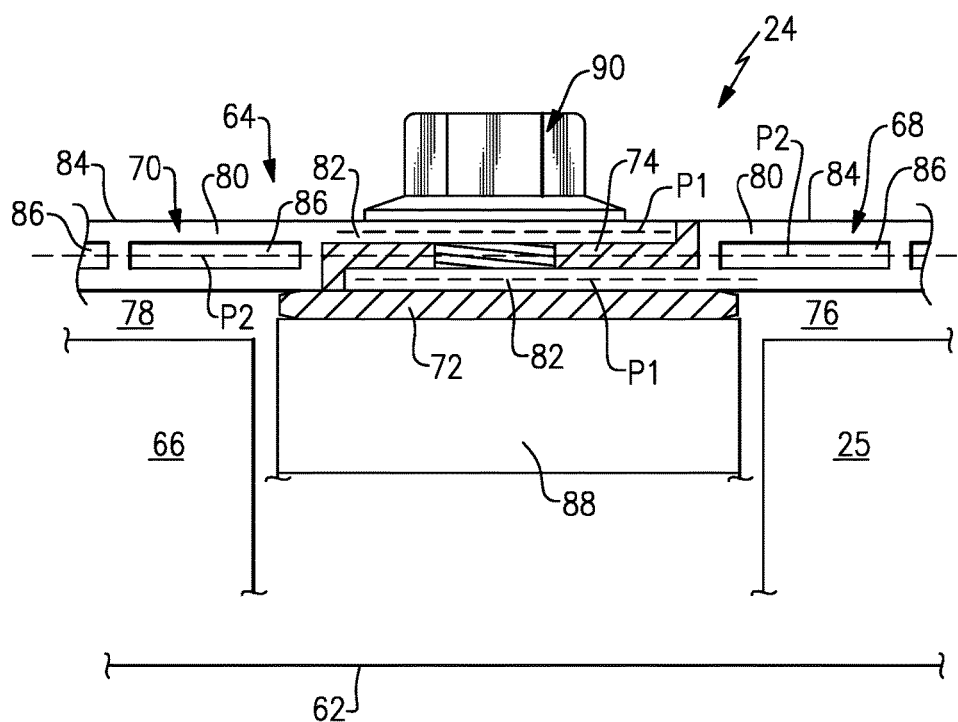
FIG. 3 illustrates a cover system of the battery pack of FIG. 2.

An exemplary cover system 64 is detailed in FIG. 3. The cover system 64 includes a first cover 68 and a second cover 70. The first cover 68 covers a first compartment 76 of the battery pack 24, and the second cover 70 covers a second compartment 78 of the battery pack 24. In a non-limiting embodiment, the first compartment 76 houses one or more battery assemblies 25, and the second compartment 78 houses one or more electronic modules 66 or serviceable components.

The first cover 68 and the second cover 70 may each embody a stepped design. For example, the first cover 68 and the second cover 70 may both include a main body 80 and a leg 82 that extends from the main body 80. The legs 82 are disposed in a first plane P1, whereas the main bodies 80 are disposed in a second plane P2 that is vertically displaced from the first plane P1.

Portions of the first cover 68 and the second cover 70 may be arranged to overlap one another. For example, in a non-limiting embodiment, the leg 82 of the second cover 70 is received over top of the leg 82 of the first cover 68. In such an arrangement, the leg 82 of the first cover 68 acts as a shelf and the leg 82 of the second cover 70 acts as a lip that overlaps the shelf. Overlapping the legs 82 in this manner positions outer faces 84 of the first and second covers 68, 70 to be substantially flush with one another.

In another non-limiting embodiment, each of the first cover 68 and the second cover 70 includes a plurality of openings 86 formed through the main body 80. The plurality of openings 86 reduce the weight of the first and second covers 68, 70 and therefore reduce the overall weight of the battery pack 24. The first cover 68 and the second cover 70 could alternatively be completely solid structures.

The cover system 64 may additionally include a first seal 72 and a second seal 74 for sealing the battery pack 24 once the cover system 64 is secured to the tray 62. In a non-limiting embodiment, the first seal 72 is disposed between the first cover 68 and a mating surface 88, and the second seal 74 is disposed between the first and second covers 68, 70. In a further non-limiting embodiment, the first seal 72 is positioned between the leg 82 of the first cover 68 and the mating surface 88, and the second seal 74 is disposed between the leg 82 of the second cover 70 and the leg 82 of the first cover 68.

The first seal 72 and the second seal 74 could be any suitable seal or combination of seals. In a non-limiting embodiment, the first seal 72 is a liquid seal and the second seal 74 is a gasket seal. However, other sealing configurations are also contemplated.

The mating surface 88 could be part of either the tray 62 or part of one or more of the battery assemblies 25. The mating surface 88 could be any wall, flange, or surface of the battery pack 24.

One or more fasteners 90 may be used to secure the cover system 64 relative to the tray 62. In a non-limiting embodiment, the fastener 90 is received through each of the leg 82 of the second cover 70, the second seal 74, the leg 82 of the first cover 68, and the first seal 72 and then extends into the mating surface 88 to secure the cover system 64 relative to the tray 62.

The first cover 68 and the second cover 70 of the cover system 64 may be made of a variety of materials. For example, the first and second covers 68, 70 could be made of aluminum, steel, or polymeric materials. In a first non-limiting embodiment, the first cover 68 and the second cover 70 are made from similar materials. In another non-limiting embodiment, the first cover 68 and the second cover 70 are made from dissimilar materials.

It may be desirable to service or test the electronic module(s) 66 of the battery pack 24. The second cover 70 is removable to access the electronic module(s) 66. The first cover 68 may be kept in place while the second cover 70 is removed. The electronic module(s) 66 may thus be serviced and/or replaced without the need to expose the battery assemblies 25 and other components located under the first cover 68. The components located within the first compartment 76 are therefore less susceptible to contamination, inadvertent damage, and other undesirable scenarios during the servicing event.

Figure 4:
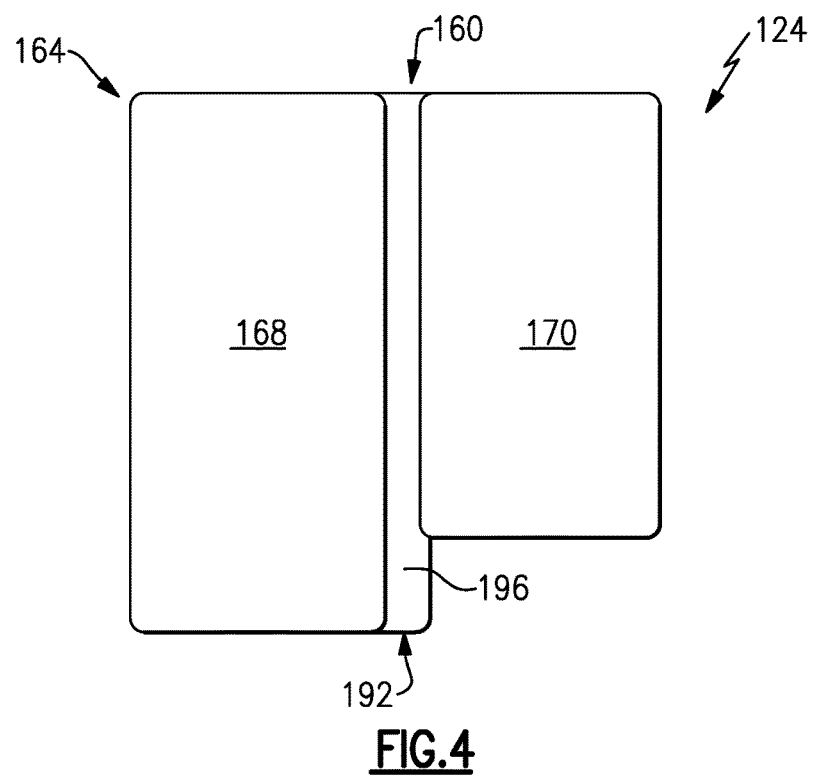
FIG. 4 illustrates a battery pack according to a second embodiment of this disclosure.
Figure 5:
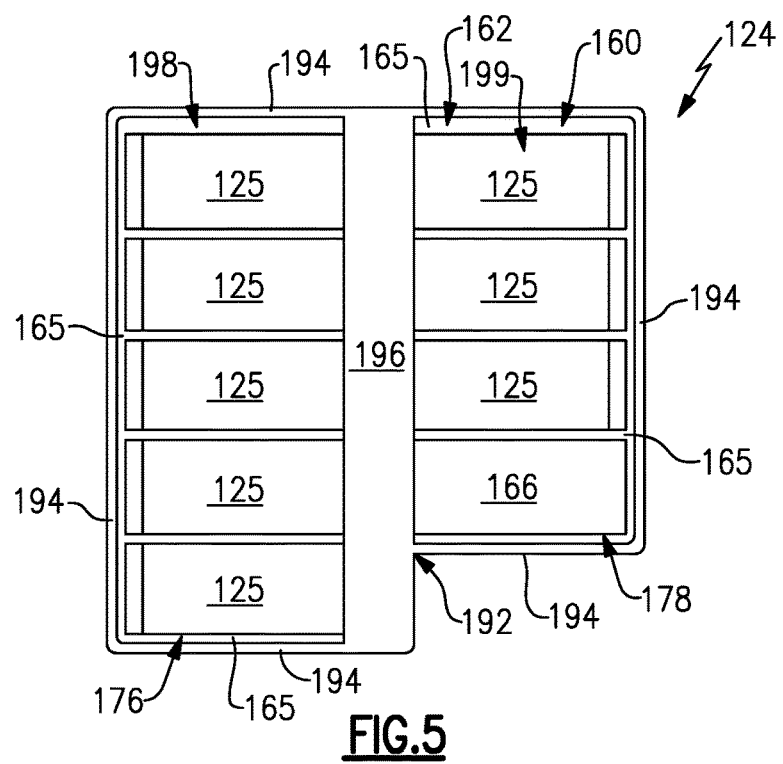
FIG. 5 illustrates the battery pack of FIG. 4 with portions of a cover system removed.
Figure 6:
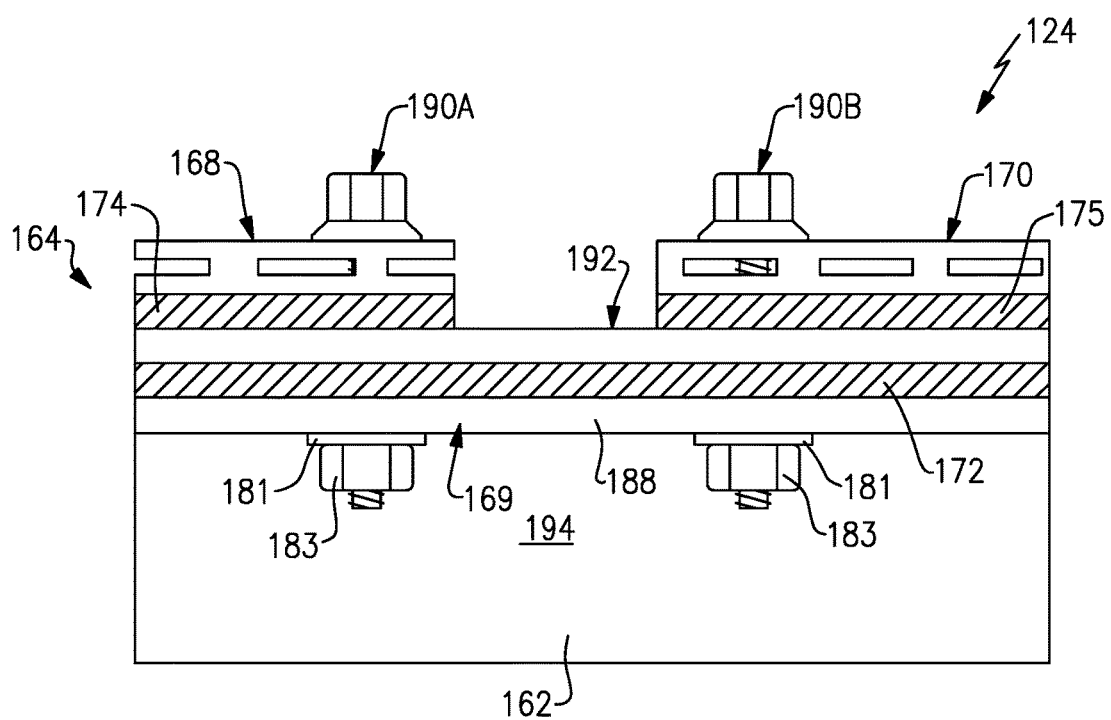
FIG. 6 illustrates an end view of the battery pack of FIG. 4.

FIGS. 4, 5, and 6 illustrate another exemplary battery pack 124. The battery pack 124 includes an enclosure assembly 160 that houses a plurality of battery assemblies 125 and one or more electronic modules 166 (see FIG. 5). The enclosure assembly includes a tray 162 and a cover system 164 secured to the tray 162. Portions of the cover system 164 have been removed in FIG. 5 to better depict the internal contents of the battery pack 124 (e.g., the battery assemblies 125 and electronic module 166).

The cover system 164 includes an insert 192, a first cover 168, and a second cover 170. The insert 192 is shaped similarly to the tray 162 and includes sidewalls 194 and a bracket 196 that extends between at least two opposing sidewalls 194. The bracket 196 separates a first opening 198 from a second opening 199 of the insert 192. The insert 192 may be received within the tray 162 to establish a first compartment 176 and a second compartment 178 spaced from the first compartment 176. Once received within the tray 162, the sidewalls 194 of the insert 192 are in contact with sidewalls 165 of the tray 162. The insert 192 may be made of aluminum, steel, or polymeric materials. Other materials are also contemplated within the scope of this disclosure.

Battery assemblies 125 are received in the first compartment 176, and the electronic module 166 is received in the second compartment 178. Several additional battery assemblies 125 may also be positioned in the second compartment 178.

The first cover 168 may be positioned over the first opening 198 of the insert 192 to enclose the first compartment 176, and the second cover 170 may be positioned over the second opening 199 to enclose the second compartment 178. In a non-limiting embodiment, the first cover 168 and the second cover 170 are arranged in a spaced apart relationship. In other words, unlike the embodiment of FIG. 3, the first cover 168 and the second cover 170 do not overlap one another. The bracket 196 of the insert 192 may extend axially between the first cover 168 and the second cover 170.

Referring now primarily to FIG. 6, the cover system 164 may additionally include a first seal 172, a second seal 174, and a third seal 175 for sealing the battery pack 24 once the insert 192, the first cover 168, and the second cover 170 are secured relative to the tray 162. In a non-limiting embodiment, the first seal 172 is disposed between one of the sidewalls 194 of the insert 192 and a mating surface 188, the second seal 174 is disposed between the first cover 168 and the sidewall 194 of the insert 192, and the third seal 175 is disposed between the second cover 170 and the sidewall 194 of the insert 192.

The first seal 172, the second seal 174, and the third seal 175 could be any suitable seal or combination of seals. In a non-limiting embodiment, the first seal 172 and the second seal 174 are both liquid seals and the third seal 175 is a gasket seal. However, other sealing configurations are also contemplated.

In a further non-limiting embodiment, the mating surface 188 is established by a flange 169 of one of the sidewalls 165 of the tray 162. However, the mating surface 188 could be any wall, flange, or surface of the battery pack 124.

In a non-limiting embodiment, a first fastener 190A is received through the first cover 168, the second seal 174, the insert 192, the first seal 172, and the mating surface 188 to secure the first cover 168 relative to the tray 162. In another non-limiting embodiment, a second fastener 190B is received through the second cover 170, the third seal 175, the insert 192, the first seal 172, and the mating surface 188 to secure the second cover 170 relative to the tray 162. A washer 181 and a nut 183 may optionally be used to tightly secure each of the first and second fasteners 190A, 190B.

It may be desirable to service the electronic module 166 of the battery pack 124. The second cover 170 is removable to access the electronic module 166. The first cover 168 may be kept in place when accessing the electronic module 166. The electronic module 166 may thus be serviced and/or replaced without the need to expose the battery assemblies 125 and other components located under the first cover 168.

Figure 7:
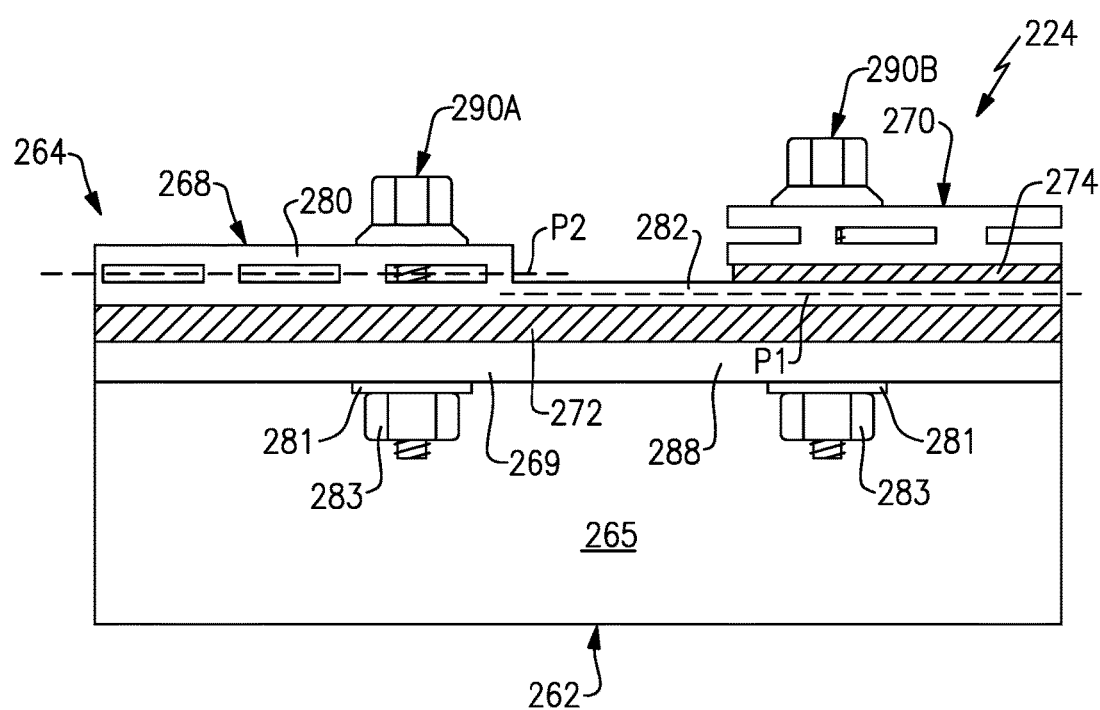
FIG. 7 illustrates a cover system of yet another exemplary battery pack.

FIG. 7 illustrates portions of another exemplary cover system 264 for a battery pack 224. The cover system 264 includes a first cover 268 and a second cover 270. The first cover 268 covers a first compartment of the battery pack 224, and the second cover 270 covers a second compartment of the battery pack 224. One or more battery assemblies may be housed within one of the compartments and one or more electronic modules may be housed in the other compartment. The compartments and components housed in the compartments are not illustrated in FIG. 7 to simplify the depiction.

The first cover 268 may embody a stepped design. For example, the first cover 268 may include a main body 280 and a leg 282 that extends from the main body 280. The leg 282 is disposed in a first plane P1, whereas the main body 280 is disposed in a second plane P2 that is vertically displaced from the first plane P1 to create the stepped design.

Portions of the first cover 268 and the second cover 270 are arranged to overlap one another. For example, in a non-limiting embodiment, the leg 282 of the first cover 268 extends underneath the second cover 270 such that the second cover 270 sits above the leg 282. The second cover 270 is thus positioned so that it is uneven, or not flush, with the first cover 268. In another embodiment, the first cover 268 and the second cover 270 are flush with one another.

The cover system 264 may additionally include a first seal 272 and a second seal 274 for sealing the battery pack 224 once the cover system 264 is secured to the tray 262. In a non-limiting embodiment, the first seal 272 is disposed between the first cover 268 and a mating surface 288, and the second seal 274 is disposed between the first and second covers 268, 270. In a further non-limiting embodiment, the second seal 274 is disposed between the leg 282 of the first cover 268 and the second cover 270.

In a further non-limiting embodiment, the mating surface 288 is established by a flange 269 of a sidewall 265 of the tray 262. However, the mating surface 288 could be any wall, flange, or surface of the battery pack 224.

A first fastener 290A may be received through the first cover 268, the first seal 272, and the mating surface 288 to secure the first cover 268 relative to the tray 262, and a second fastener 290B may be received through the second cover 270, the second seal 174, the leg 282 of the first cover 268, the first seal 272, and the mating surface 288 to secure the second cover 270 relative to the tray 262. A washer 281 and a nut 283 may optionally be employed to tightly secure each of the first and second fasteners 290A, 290B.

The second cover 270 is removable to access one or more serviceable electronic modules of the battery pack 224. The first cover 268 may be kept in place when the second cover 270 is removed. The electronic module(s) may thus be serviced and/or replaced without the need to expose the battery assemblies and other components located under the first cover 268.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:
1. A battery pack, comprising:
an enclosure assembly including a tray and a cover system secured relative to said tray, said cover system including a first cover and a second cover that overlap one another; and a gasket seal located between said first cover and said second cover or a liquid seal located between one of said first cover and said second cover and a mating surface of said tray,
at least one of said first cover and said second cover includes a stepped design.

2. The battery pack as recited in claim 1, wherein both of said first cover and said second cover include stepped designs.

3. The battery pack as recited in claim 1, wherein said at least one of said first cover and said second cover includes a main body and a leg that extends from said main body.

4. The battery pack as recited in claim 3, wherein said leg extends in a first plane and said main body extends in a second plane that is vertically displaced from said first plane.

5. The battery pack as recited in claim 1, wherein said first cover includes a first leg that overlaps a second leg of said second cover.

6. A battery pack, comprising:
an enclosure assembly including a tray and a cover system secured relative to said tray, said cover system including a first cover and a second cover that overlap one another;
at least one of said first cover and said second cover includes a stepped design;
a first seal disposed between said first cover and a mating surface of said tray; and
a second seal disposed between said first cover and said second cover.

7. The battery pack as recited in claim 6, comprising a fastener that extends through said second cover, said second seal, said first cover, and then through said first seal.

8. A battery pack, comprising:
an enclosure assembly including a tray and a cover system secured relative to said tray, said cover system including a first cover and a second cover that overlap one another; and
at least one of said first cover and said second cover includes a stepped design,
wherein each of said first cover and said second cover include a plurality of weight reducing openings.

9. The battery pack as recited in claim 1, wherein said first cover includes a leg that extends underneath of said second cover.

10. The battery pack as recited in claim 9, comprising a first seal positioned between said leg and a mating surface of said tray.

11. A battery pack, comprising:
an enclosure assembly including a tray and a cover system secured relative to said tray, said cover system including a first cover and a second cover that overlap one another;
at least one of said first cover and said second cover includes a stepped design;
said first cover includes a leg that extends underneath of said second cover;
a first seal is positioned between said leg and a mating surface of said tray; and
a second seal is positioned between said leg and said second cover.

12. The battery pack as recited in claim 1, comprising a fastener that extends through each of said first cover, said second cover, and said liquid seal or said gasket seal.

* * * * *